(12) United States Patent
Yu et al.

(10) Patent No.: US 10,510,360 B2
(45) Date of Patent: Dec. 17, 2019

(54) ENHANCING AUDIO SIGNALS USING SUB-BAND DEEP NEURAL NETWORKS

(71) Applicant: Alibaba Group Holding Limited

(72) Inventors: Tao Yu, Bellevue, WA (US); Ming Tu, Tempe, AZ (US); Gang Liu, Bellevue, WA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/391,657

(22) Filed: Apr. 23, 2019

(65) Prior Publication Data
US 2019/0251985 A1 Aug. 15, 2019

Related U.S. Application Data

(63) Continuation of application No. 15/869,566, filed on Jan. 12, 2018, now Pat. No. 10,283,140.

(51) Int. Cl.
| | | |
|---|---|---|
| G10L 21/0232 | (2013.01) | |
| G06F 17/14 | (2006.01) | |
| G10L 25/30 | (2013.01) | |
| G10L 19/04 | (2013.01) | |
| G10L 25/93 | (2013.01) | |

(52) U.S. Cl.
CPC ........ G10L 21/0232 (2013.01); G06F 17/141 (2013.01); G10L 19/04 (2013.01); G10L 25/30 (2013.01); G10L 2025/937 (2013.01)

(58) Field of Classification Search
CPC ..... H04B 3/20; G06F 17/141; G10L 21/0232; G10L 19/04; G10L 25/30; G10L 2025/937

USPC ....... 381/66, 94.2, 94.3, 124; 706/12, 15, 16
See application file for complete search history.

(56) References Cited

U.S. PATENT DOCUMENTS

| | | |
|---|---|---|
| 5,583,784 A | 12/1996 | Kapusl et al. |
| 6,453,284 B1 | 9/2002 | Paschall |
| 6,678,421 B1 | 1/2004 | Daniell et al. |

(Continued)

FOREIGN PATENT DOCUMENTS

| | | |
|---|---|---|
| EP | 1152399 A1 | 11/2001 |
| WO | 2001097528 A2 | 12/2001 |
| WO | 2017176384 A2 | 10/2017 |

OTHER PUBLICATIONS

Aurelio Uncini & Gianandrea Cocchi, Subband Neural Networks for Noisy Signal Forecasting and Missing Data Reconstruction, IEEE, pp. 438-441 (2002).

(Continued)

*Primary Examiner* — William A Jerez Lora
(74) *Attorney, Agent, or Firm* — James J. DeCarlo; Greenberg Traurig, LLP

(57) ABSTRACT

Systems and methods for enhancing reverberated audio signals are disclosed. In one embodiment, a method is disclosed comprising receiving an audio signal; partitioning a frequency domain representation of the audio signal into a plurality of sub-band vectors; inputting each sub-band vector into a corresponding deep neural network; calculating, using the corresponding deep neural networks, a plurality of output vectors for each sub-band; concatenating the plurality of output vectors to generate a clean audio feature matrix; and converting the clean audio feature matrix into a time-domain audio signal.

21 Claims, 9 Drawing Sheets

(56) References Cited

U.S. PATENT DOCUMENTS

| | | | |
|---|---|---|---|
| 6,804,651 B2* | 10/2004 | Juric | G10L 25/69 381/120 |
| 6,820,053 B1* | 11/2004 | Ruwisch | G10L 21/0208 381/94.3 |
| 9,064,498 B2 | 6/2015 | Uhle et al. | |
| 10,140,980 B2* | 11/2018 | Bengio | G10L 15/16 |
| 2002/0191798 A1* | 12/2002 | Juric | G10L 25/69 381/56 |
| 2006/0031066 A1* | 2/2006 | Hetherington | G10L 21/0208 704/226 |
| 2007/0083365 A1 | 4/2007 | Shmunk | |
| 2011/0224976 A1 | 9/2011 | Taal et al. | |
| 2016/0078863 A1* | 3/2016 | Chung | G10L 15/16 704/232 |
| 2016/0092766 A1* | 3/2016 | Sainath | G10L 25/30 706/20 |
| 2016/0189730 A1* | 6/2016 | Du | G10L 21/0272 704/233 |
| 2017/0061978 A1* | 3/2017 | Wang | G10L 21/0232 |
| 2017/0148465 A1 | 5/2017 | Bradley et al. | |
| 2017/0162194 A1* | 6/2017 | Nesta | G10L 25/30 |
| 2017/0171683 A1* | 6/2017 | Kim | G10L 19/0212 |
| 2017/0330071 A1* | 11/2017 | Roblek | G06F 3/16 |
| 2018/0082691 A1* | 3/2018 | Khoury | G10L 17/02 |

OTHER PUBLICATIONS

Aurelio Uncini, Audio Signal Processing by Neural Networks, IEEE, 45 pages (2003).

International Search Report and Written Opinion to corresponding International Application No. PCT/US18/56995 dated Dec. 31, 2018 (9 pages).

Ming Tu, Xianxian Zhang, Speech Enhancement Based on Deep Neural Networks With Skip Connections, IEEE, pp. 5565-5569 (2017).

Sek Chai, Aswin Raghavan, David Zhang, Mohamed Amer, Tim Shields, Low Precision Neural Networks using Subband Decomposition, Presented at CogArch Workshop, Atlanta, GA, pp. 1-5 (2016).

* cited by examiner

ENHANCING AUDIO SIGNALS USING SUB-BAND DEEP NEURAL NETWORKS

CROSS-REFERENCE TO RELATED APPLICATIONS

This application is a continuation of U.S. patent application Ser. No. 15/869,566, filed Jan. 12, 2018.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever

BACKGROUND

Technical Field

The disclosed embodiments are directed to audio signal processing and, specifically to systems, devices, and methods for enhancing the quality of an audio signal using sub-band deep neural network (DNN) systems.

Description of the Related Art

Currently, many devices utilize speech enhancement to process audio signals. Examples of such devices include "personal assistants" such as APPLE'S SIRI, GOOGLE HOME, AMAZON ALEXA, and various other devices. These devices include microphone elements that capture analog audio signals and attempt to perform speech recognition to convert human speech into data structures that a microprocessor can process. In general, these devices attempt to improve speech quality of a degraded audio signal by reducing the effect of background noise and compensating for low signal-to-noise ratios (SNRs).

Environmental noise and room reverberation are key factors in speech recognition and audio processing. Often, these factors severely degrade the functionality of a device, often rendering the device inoperable. Current techniques for addressing these factors still result in less than ideal outputs. Compared to additive and multiplicative noise, reverberation poses different challenges in audio enhancement because a longer time span of an audio signal may be affected by reverberation. Thus, current techniques for addressing additive and multiplicative noise are incapable of adequately handling reverberation in audio signals.

Currently, systems utilize various techniques to address the shortcomings of additive and multiplicative noise reduction. Some systems have utilized a minimum mean square error (MMSE) algorithm to reduce speech reverberation. However, MMSE results in a distorted output signal. Other systems have utilized weighted prediction error (WPE) algorithms based on linear prediction to estimate late reverberation under the assumption that the algorithms can linearly predict later reverberation based on previous signals. While this technique is adequate in multi-channel signals, the technique fails to accurate predict reverberation in single-channel cases.

The MMSE and WPE techniques are based on statistic assumptions of a room's acoustic model. Other techniques have used DNNs to predict a clean signal from a degraded signal. DNNs learn complex non-linear mappings using a training input set and a known output set. The use of DNNs to predict clean signals improved upon the MMSE and WPE approaches but are still lacking. Specifically, all DNN-based approaches utilize a full spectrum band as an input to a DNN. For example, some systems have relied upon determining an ideal ratio mask (IRM) as a DNN training target. Thus, these systems generate a complex IRM as a DNN output.

Thus, there currently is a technical deficiency in current systems in processing degraded audio signals. Specifically, current technical solutions fail to produce clean audio signals from degraded audio signals using MMSE and WPE algorithms, among others. Further, these systems are unable to remove the effects of reverberation in a single-channel audio signal.

SUMMARY

The disclosed embodiments utilize multiple sub-band neural networks to generate a predicted clean audio signal from a degraded audio signal. In contrast to the MMSE and WPE approaches, the disclosed embodiments do not rely upon an acoustical model of a room and are not linear. In contrast to existing DNN approaches, the disclosed embodiments do not predict a complex IRM using a single DNN applied to a full spectrum band.

The disclosed embodiments remedy the problems in current systems and techniques by training multiple DNNs for separate sub-bands of an audio signal. In general, most of the sound reflectors in an acoustic environment have different absorption coefficients in different frequencies. Thus, different room impulse responses (RIRs) generate different frequency sub-bands of reverberant speech, and these sub-bands have different spectra statistics. Additionally, clean speech has different time-frequency characteristics in different sub-bands. By analyzing the entire spectrum, current DNN techniques fail to exploit this aspect of reverberation.

The disclosed embodiments also exploit strategies that the disclosed embodiments may share between sub-bands. The embodiments can identify sub-bands with similar characteristics (e.g., high-frequency bands) and share network parameters associated with these sub-bands. Finally, the embodiments can combine certain weight groups of sub-bands that are more important for specific tasks and less important for other tasks.

The description of the following embodiments describes these technical solutions and advantages in more detail. The disclosed embodiments provide enhanced speech equality and lower word error rates by downstream processing devices as compared to existing solutions. Further, the disclosed embodiments have applications in other speech-based systems such as wake-up word detection, speaker verification, and other systems.

BRIEF DESCRIPTION OF THE FIGURES

The preceding and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1A:
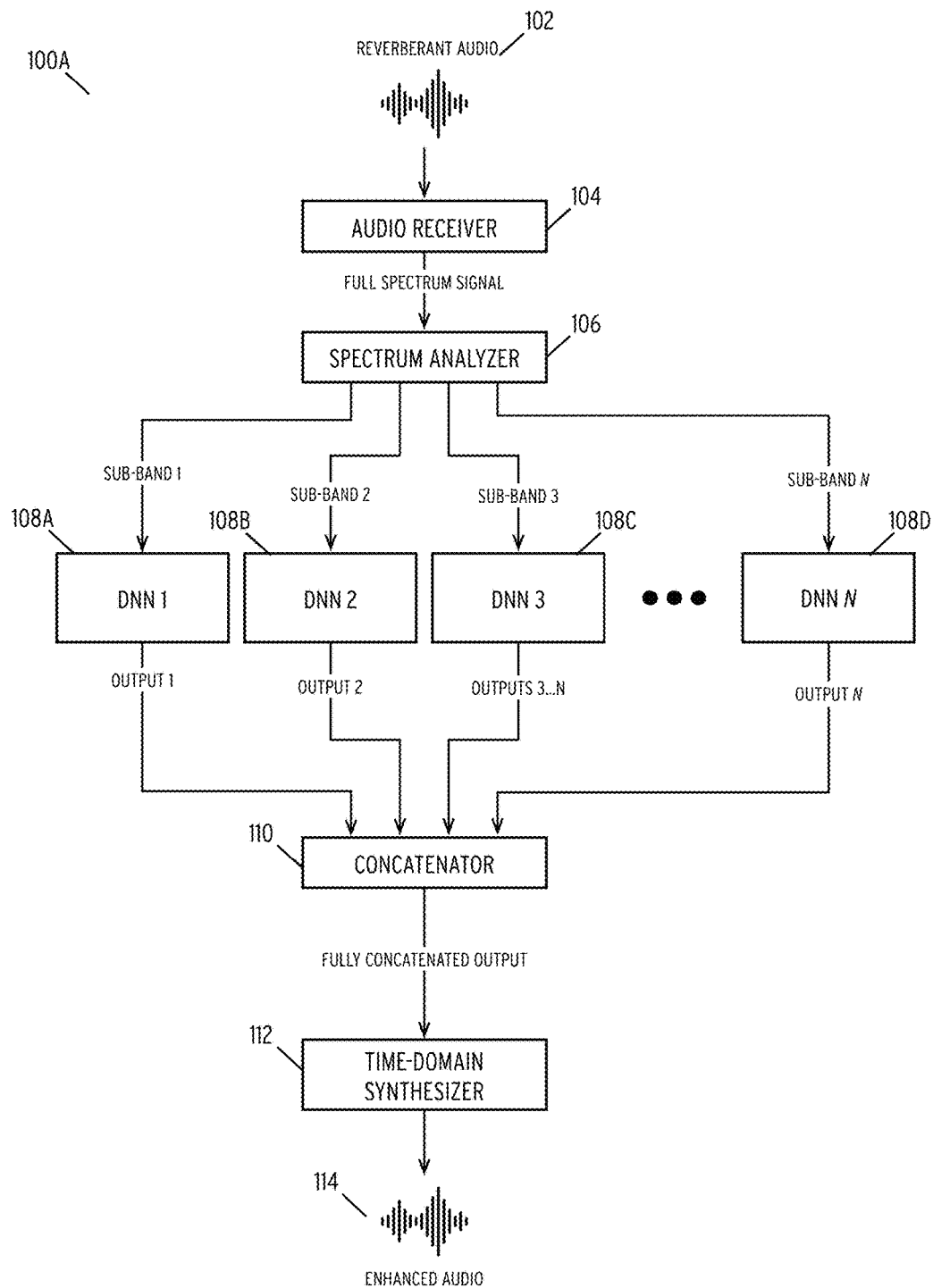
FIGS. 1A, 1B, and 1C are functional diagrams illustrating devices for enhancing the quality of an audio signal according to some embodiments of the disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Figure 1B:
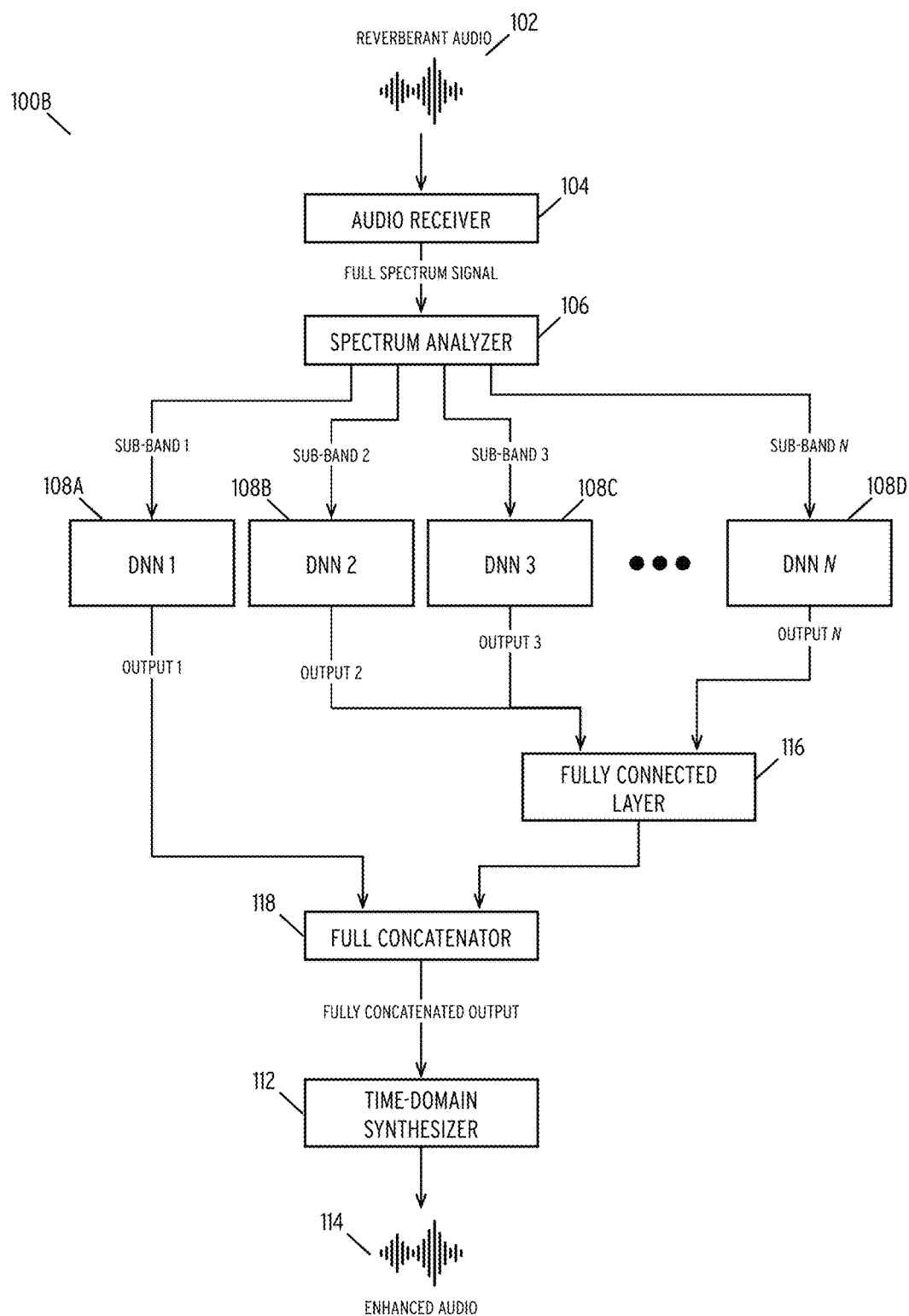
Figure 1C:
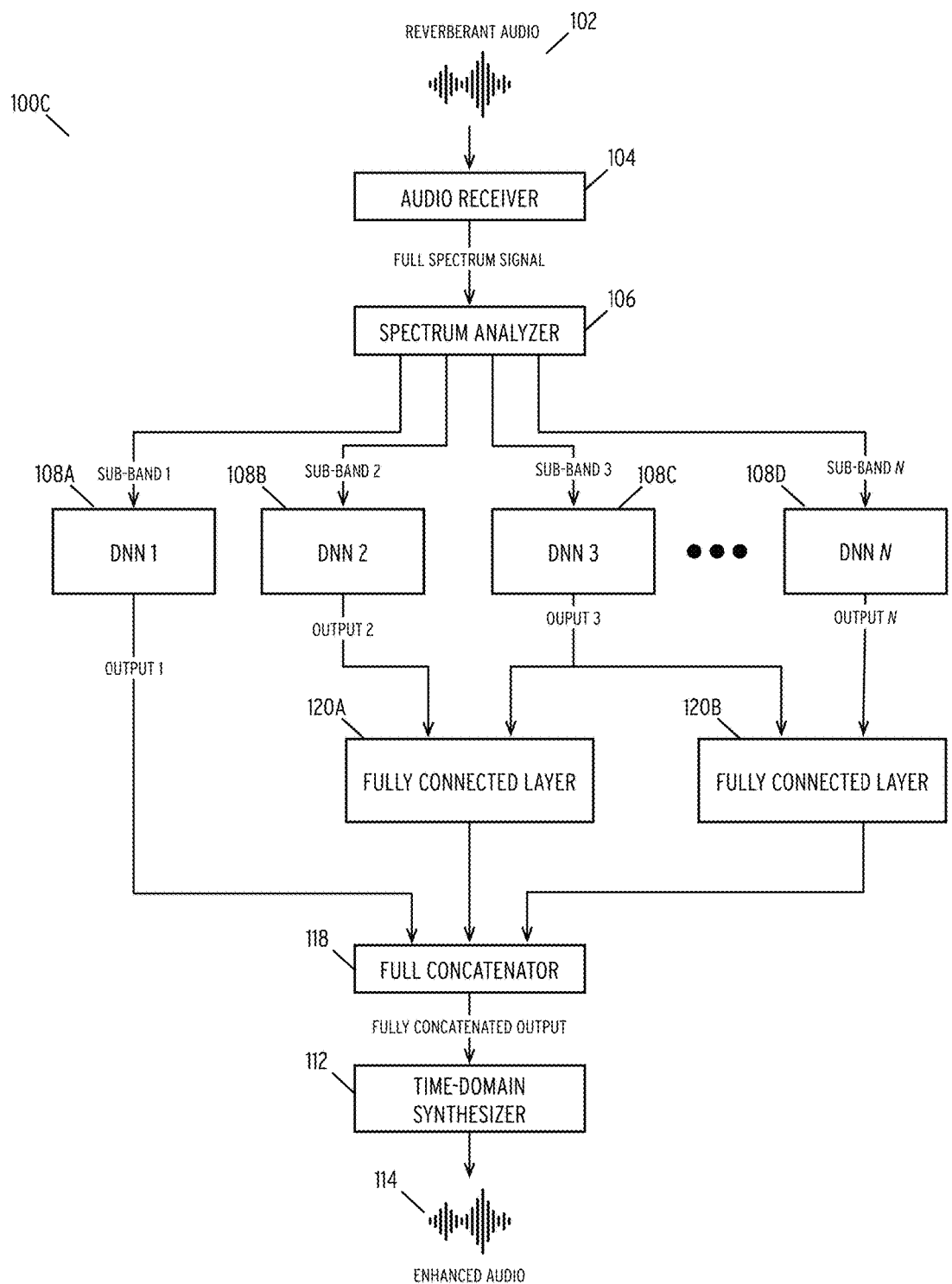

FIGS. 1A, 1B, and 1C are functional diagrams illustrating devices for enhancing the quality of an audio signal according to some embodiments of the disclosure.

FIGS. 1A, 1B, and 1C illustrate alternative embodiments of devices 100A, 100 B, and 100C, respectively, for enhancing the quality of an audio signal. FIG. 1A depicts a first embodiment of a device 100A wherein the device processes individual sub-bands of an audio signal using DNNs. FIG. 1B depicts a second embodiment of a device 100B wherein the device processes individual sub-bands of an audio signal using DNNs and partially concatenates selected sub-bands. FIG. 1C depicts a third embodiment of a device 100C wherein the device processes individual sub-bands of an audio signal using DNNs and partially concatenates selected sub-bands, where the device 100C shares sub-bands between concatenates. In each of FIGS. 1A through 1C, the devices may be hardware devices, software devices, or combinations thereof. In some embodiments, the device may be FPGA devices or ASIC devices.

In FIG. 1A, the device 100A receives a reverberant audio signal 102 via audio receiver 104. In one embodiment, the audio receiver 104 is a microphone, audio jack, or other analog receiving devices. In alternative embodiments, the audio receiver 104 comprises a network interface that receives audio signals over a network. In some embodiments, a device such as a personal assistant, mobile device, laptop computer, or any computing device that processes audio signals may include or house the audio receiver 104. In certain embodiments, audio receiver 104 additionally includes an analog to digital converter for converting audio signals to digital representations. The audio receiver 104 receives a full spectrum audio signal and forwards the signal to spectrum analyzer 106.

Spectrum analyzer 106 may comprise a hardware or software module for converting the full-spectrum audio signals into individual sub-bands. In some embodiments, spectrum analyzer 106 may employ a short time Fourier transform (STFT) to generate a feature matrix representing the audio sequence. The description of FIGS. 2A and 2B describe the operations of the spectrum analyzer 106 and is incorporated herein by reference in its entirety.

Spectrum analyzer 106 splits the feature matrix into individual sub-bands (illustrated as sub-bands 1 through N). The disclosure places no limitations on the number of sub-bands and, as will be discussed, one may configure the number of sub-bands in various manners. Each sub-band comprises a vector of discrete Fourier transform (DFT) coefficients. Audio receiver 104 and spectrum analyzer 106 may perform the above operations on a frame-by-frame basis for a given audio signal.

DNNs 1 through N (108A, 108B, 108C, 108D) receive the sub-band vectors from the spectrum analyzer. In some embodiments, the DNNs 108A-108D receive the vectors over a local device bus. In other embodiments, the DNNs 108A-108D may receive the vectors over a network. In this embodiment, audio interface 104 and spectrum analyzer 106 are situated in a first device while DNNs 108A-108D are situated in a second device. These devices may be geographically, or logically, separated and connected via a local or wide area network.

In one embodiment, the device 100A implements the DNNs 108A-108D as bidirectional Recurrent Neural Networks (RNNs) with Long Short-Term Memory (LSTM) units. RNNs may be utilized when the DNNs are trained using individual frames. In contrast, the DNNs 108A-108D may be implemented as a fully connected network (FCN) is sequences of frames are used in training. Each DNN 108A-108D is trained using a mapping of reverberant audio frames and known, clean audio frames associated with a given sub-band.

The DNNs 108A-108D output a vector of clean DFT coefficients which the DNNs generate for each sub-band. DNNs 108A-108D transmit these outputs to concatenator 110. In one embodiment, concatenator 110 comprises a hardware or software device (or combination thereof) that receives the multiple output vectors and rebuilds a feature matrix representing enhanced audio signal 114.

Time-domain synthesizer 112 receives the fully concatenated feature matrix from concatenator 110 and converts the matrix into a time-domain signal. In one embodiment, the time-domain synthesizer 112 uses an overlap-add algorithm to convert the feature matrix into the time domain.

Reverberant audio signal 102, audio receiver, spectrum analyzer 106, time-domain synthesizer 112, and enhanced audio signal 114 function identically in FIGS. 1B and 1C and the description of these components and signals are not repeated for the sake of clarity.

Although described in the context of DNNs, other machine learning or deep learning models may be used in place of specific DNN models. In general, a given machine learning model would be trained for each sub-band, and the model would be used to predict a clean output signal for each sub-band in the manner described herein.

In contrast to FIG. 1A, FIG. 1B includes a fully connected layer 116. In this embodiment, the outputs of DNNs 2 through N may comprise an interim output of the respective DNNs. In one embodiment, this output may be the result of processing the input vector through one or more hidden layers of a respective DNN and, optionally, a fully connected layer of the DNN.

As illustrated, the input to fully connected layer 116 comprises the output vectors from the interim stages of DNNs 2 through N. In one embodiment, the fully connected layer 116 processes the output vectors and generates an output vector to be utilized the full concatenator 118, described previously.

FIG. 1C illustrates an alternative architecture for enhancing the quality of an audio signal. As in FIG. 1B, the device distributes DNN processing among groups of sub-bands. Additionally, as in FIG. 1B, the outputs of DNNs 2 through N comprise partially processed outputs of an initial set of layers of the respective DNNs (e.g., the outputs of the first two hidden layers and one fully connected layer).

In contrast to FIG. 1B, FIG. 1C illustrates that fully connected layers 120A, 120B receive, as inputs, outputs from a combination of DNNs. As explicitly illustrated, the input of fully connected layer 120A comprises the output of DNNs 2 and 3 whereas the input of fully connected layer 120B comprises the output of DNNs 3 and N. In one embodiment, the grouping and merging of sub-bands may be generated based on the characteristics of individual sub-bands overlapping. Details of grouping sub-bands are described more fully in connection with FIGS. 3A through 3C.

Figure 2A:
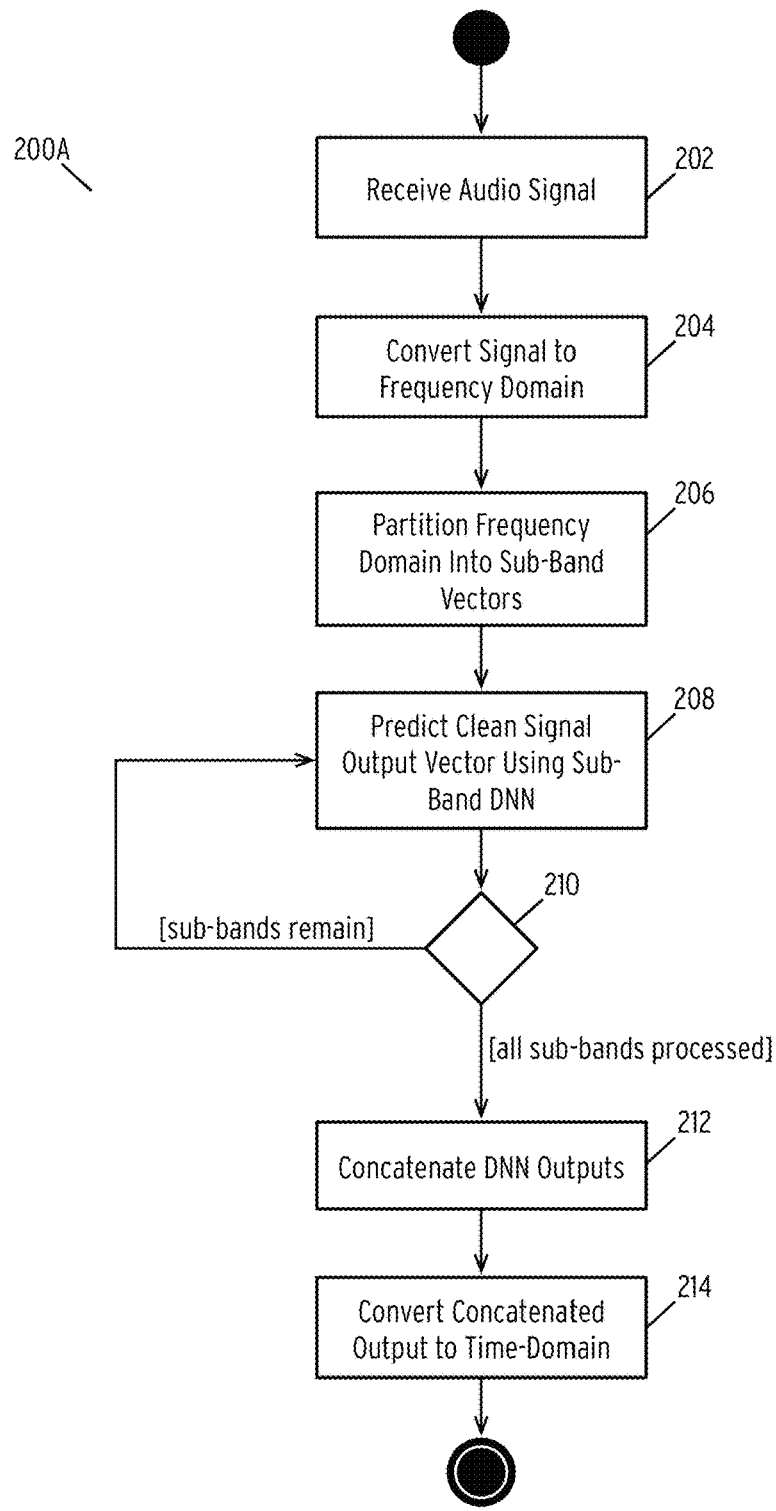
FIGS. 2A and 2B are flow diagrams illustrating methods for enhancing the quality of an audio signal according to some embodiments of the disclosure.

FIG. 2A is a flow diagram illustrating a method for enhancing the quality of an audio signal according to some embodiments of the disclosure.

In step 202, the method receives an audio signal.

In one embodiment, the method receives the audio signal via an audio input device (e.g., microphone, input jack, etc.) or a network connection. In some embodiments, the audio signal comprises a single channel audio signal.

In step 204, the method converts the audio signal into the frequency domain.

In one embodiment of step 204, the method converts an audio signal into a feature matrix. The feature matrix comprises an array of rows, wherein each row represents the DFT coefficients calculated for a frame of the audio signal. In one embodiment, step 204 utilizes a short-time Fourier transform (STFT) with a predefined window length. In one embodiment, this window length M. In one embodiment, the window length is 25 milliseconds. In one embodiment, a spectrum analyzer (e.g., spectrum analyzer 104) performs step 204.

In step 206, the method partitions the frequency domain representation into a plurality of sub-band vectors.

As described above, step 204 converts the audio signal into a feature matrix of DFT coefficients. In step 206, the method partitions the DFT coefficients of each frame of audio into N sub-bands, where N may be configurable. In one embodiment, step 206 partitions the sub-bands using an equal distribution. In another embodiment, step 206 partitions the sub-bands non-equally. In general, step 206 partitions a DFT coefficient vector into a plurality of sub-vectors.

For example, a signal may have a maximum frequency of 8000 Hz. In the first embodiment, N may be four, and the sub-bands may be 0-2000 Hz, 2000-4000 Hz, 4000-6000 Hz, and 6000-8000 Hz. Alternatively, step 206 may use different values of N (e.g., six, eight, etc.). In some embodiments, step 206 may utilize a value of N determined based on the frequency range of the audio signal. In other embodiments, the size of each sub-band may be non-uniform. For example, the method may partition the previous 8000 Hz signal into sub-bands of 0-1000 Hz, 1000-4000 Hz, 4000-6000 Hz, and 6000-8000 Hz.

In step 208, the method predicts a clean audio signal for a given sub-band using a sub-band DNN.

In the illustrated embodiment, the method identifies a DNN associated with each sub-band. In this embodiment, the method inputs a given sub-band vector into the associated DNN. The DNN generates an output sub-band vector representing DFT coefficients of a clean audio signal corresponding to the reverberated input signal.

Before executing, the method trains each DNN for a given sub-band. Training a DNN comprises providing a large input and output data set to a baseline DNN to generate the appropriate activation functions for each layer of the DNN. In some embodiments, training a DNN comprises using a gradient descent technique to generate network weights for each layer of the DNN.

In one embodiment, the method trains the DNNs using a mean-square error (MSE) cost function to converge upon the appropriate network layer weights and biases.

In one embodiment, the method uses a baseline DNN to generate the network parameters. The baseline DNN may comprise a two-layer bi-directional recurrent neural network (RNN) (referred to as "hidden layers") followed by two fully connected (FC) layers. Each recurrent layer may include a predefined number of LSTM units (e.g., 128) and each FC layer may have a predefined number of nodes (e.g., 256). The resulting DNN would thus have a specified number of network parameters (e.g., approximately 1 million using the example number of unit LTSM units and FC nodes). The above examples of the number of LSTM units and FC nodes are exemplary only, and other combinations may be used. For example, in another embodiment, the method may use 90 LSTM units and 180 FC nodes in the corresponding layers. In some embodiments, gated recurrent unit cells may be utilized in place of LSTM units.

In many application, low-frequency information is of higher importance for both human and machine speech perception. Mel warping is commonly used in feature extraction for automatic speech recognition which emphasizes speech information in low frequency with high resolution. Alternatively, or in conjunction with the preceding, during the training stage, the cost on low-frequency sub-band outputs can be emphasized by being weighted more when calculating the MSE training objective.

The method uses the resulting DNN trained using the baseline DNN as a sub-band DNN.

In step 210, the method determines if all sub-bands have been analyzed. If not, the method repeats step 208 for each remaining sub-band. While illustrated as a sequential process, in some embodiments, each the method may analyze each sub-band in parallel. In this embodiment, the method simply checks to confirm that each DNN has finished processing the sub-band before moving on to step 212.

In step 212, the method concatenates the clean signals into an output matrix output. In one embodiment, the method may combine each of the output vectors generated by the DNNs in the proper order based on the location of each sub-band. In one embodiment, the resulting output is a clean audio feature matrix having the same dimensions as the feature matrix the method generated in step 204 but having clean audio signal DFT coefficients instead of the original DFT coefficients.

In step 214, the method converts the fully connected output to a time-domain signal. In one embodiment, the method utilizes an overlap-add algorithm to convert the clean audio feature matrix into a time-domain signal. In one embodiment, the method may further output the result to a speaker. In another embodiment, instead of converting the clean audio feature matrix to a time-domain signal, the method may transmit the frequency-domain representation to an external device for further processing.

Figure 2B:
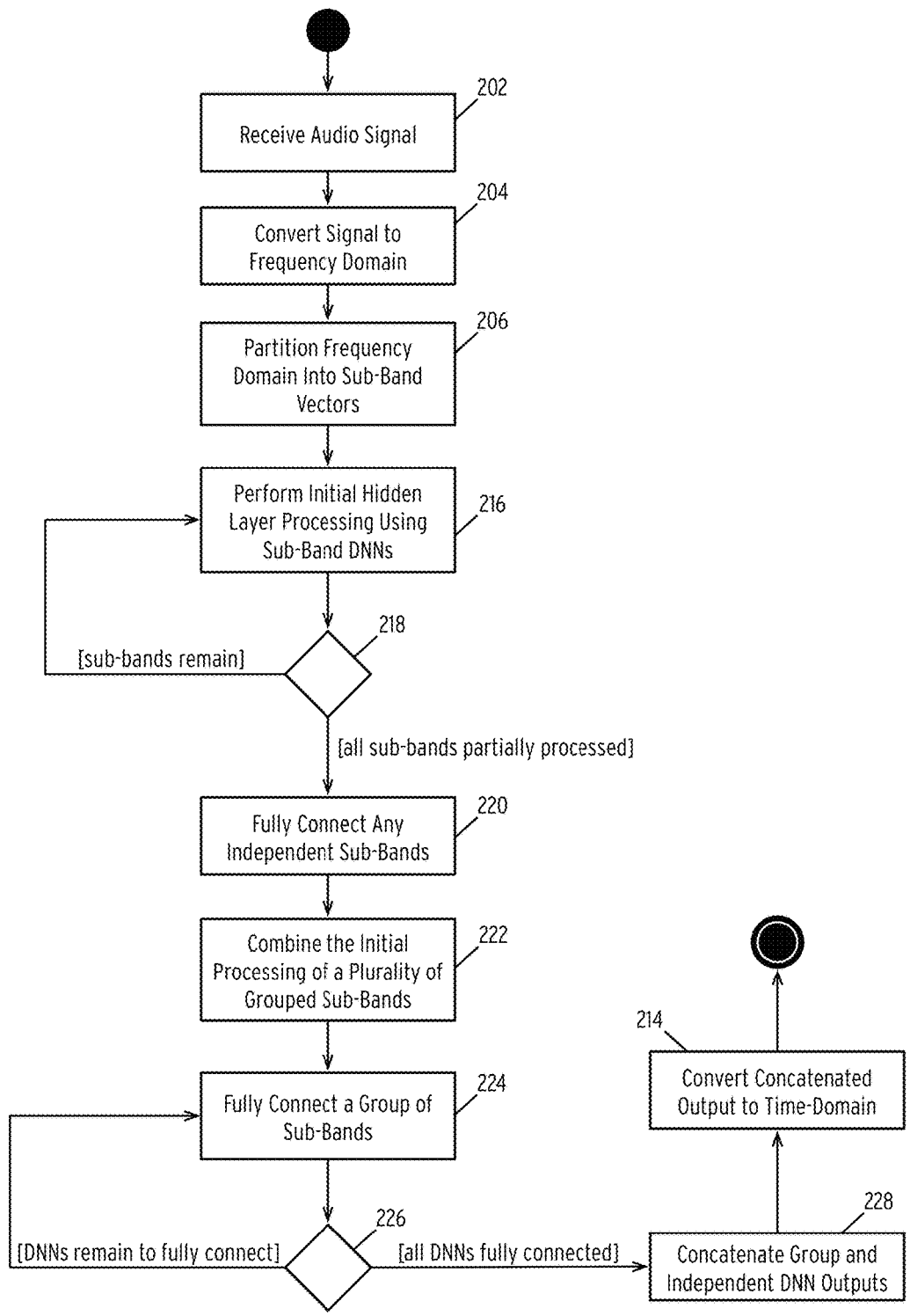

FIG. 2B illustrates an alternative embodiment for enhancing the quality of an audio signal.

Steps 202, 204, 206, and 214 in FIG. 2B were previously described in the description of FIG. 2A and the operations of these steps are performed similarly in FIG. 2B. Thus, the description of these steps is not repeated herein and is incorporated by reference in its entirety. FIG. 2B differs from FIG. 2A primarily in that the processing of sub-bands may be combined.

In step 216, the method performs initial hidden layer processing of the sub-band vectors. In one embodiment, the initial processing comprises executing processing the sub-band vectors using the first stages of a DNN (e.g., the RNN layers and, in some embodiments, one of the FC layers). The result is a partial DNN output.

In step 218, the method checks that all sub-bands have been processed and, if not, continues the process the sub-bands in step 216. Once all sub-bands have been partially processed, the method proceeds to step 220.

In step 220, the method fully connects any independent sub-bands.

In one embodiment, the method performs step 220 in a manner like that described in step 208 of FIG. 2A. Specifically, an independent sub-band comprises a sub-band that the method fully processes using a single DNN. That is, the method uses all RNN and FC layers of a single DNN to process the sub-band. The resulting output is a clean output vector for such a sub-band using one DNN.

However, in the illustrated method, certain sub-bands may be combined to exploit similarities between sub-band characteristics. For example, sub-bands on a low or high-end of a spectrum may exhibit similar tendencies and may be combined during training and processing. As described above, a DNN includes multiple layers including, for example, two RNN layers and two FC layers. In one embodiment, the initial processing of a sub-band vector comprises passing the vector through the RNN layers and the first FC layer. However, for grouped sub-bands, the final FC layer may be tuned to operate on the combined outputs of the sub-band processing, as discussed herein.

In step 222, the method combines the initial processing of a plurality of grouped sub-bands.

In one embodiment, sub-bands are grouped based on similarities between sub-bands. For each group, the method generates an interim vector generated during the initial layers of the DNN. In one embodiment, this interim vector is of a length VD, where N is the number of grouped sub-bands and D is the dimension of the sub-band. Thus, in step 222, the method generates an interim vector from the outputs of the initial layers of the individual sub-band DNNs.

In step 224, the method fully connects a group of sub-bands.

In one embodiment, the method takes the node outputs of the initial processing layers for a group of sub-bands and uses these as inputs to a fully connected layer. In another embodiment, the method may use less than all outputs of the initial processing layers as inputs to a fully connected layer. For example, the method may use output vectors 1 and 2 as inputs to a fully connected layer and output vectors 2 and 3 as inputs to a second fully connected layer.

Figure 3A:
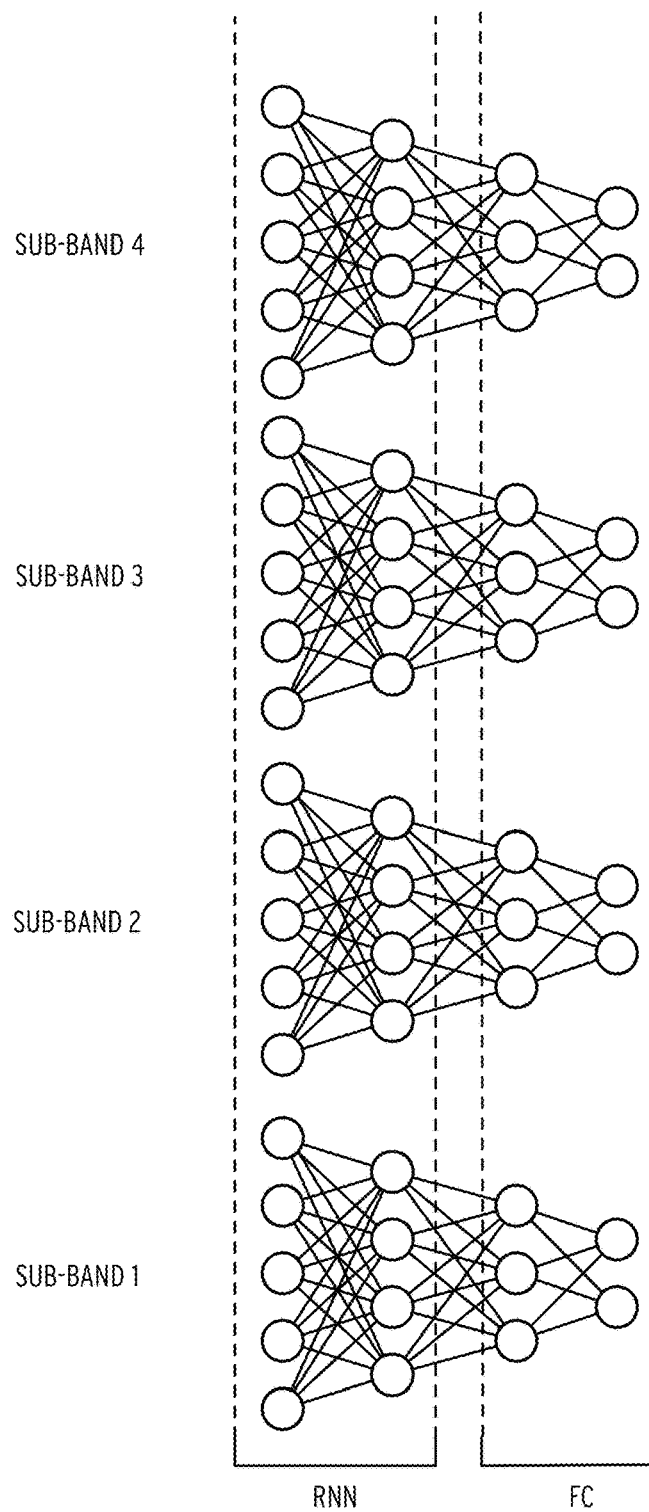
FIGS. 3A, 3B, and 3C are neural network diagrams of exemplary deep neural networks according to some embodiments of the disclosure.
Figure 3B:
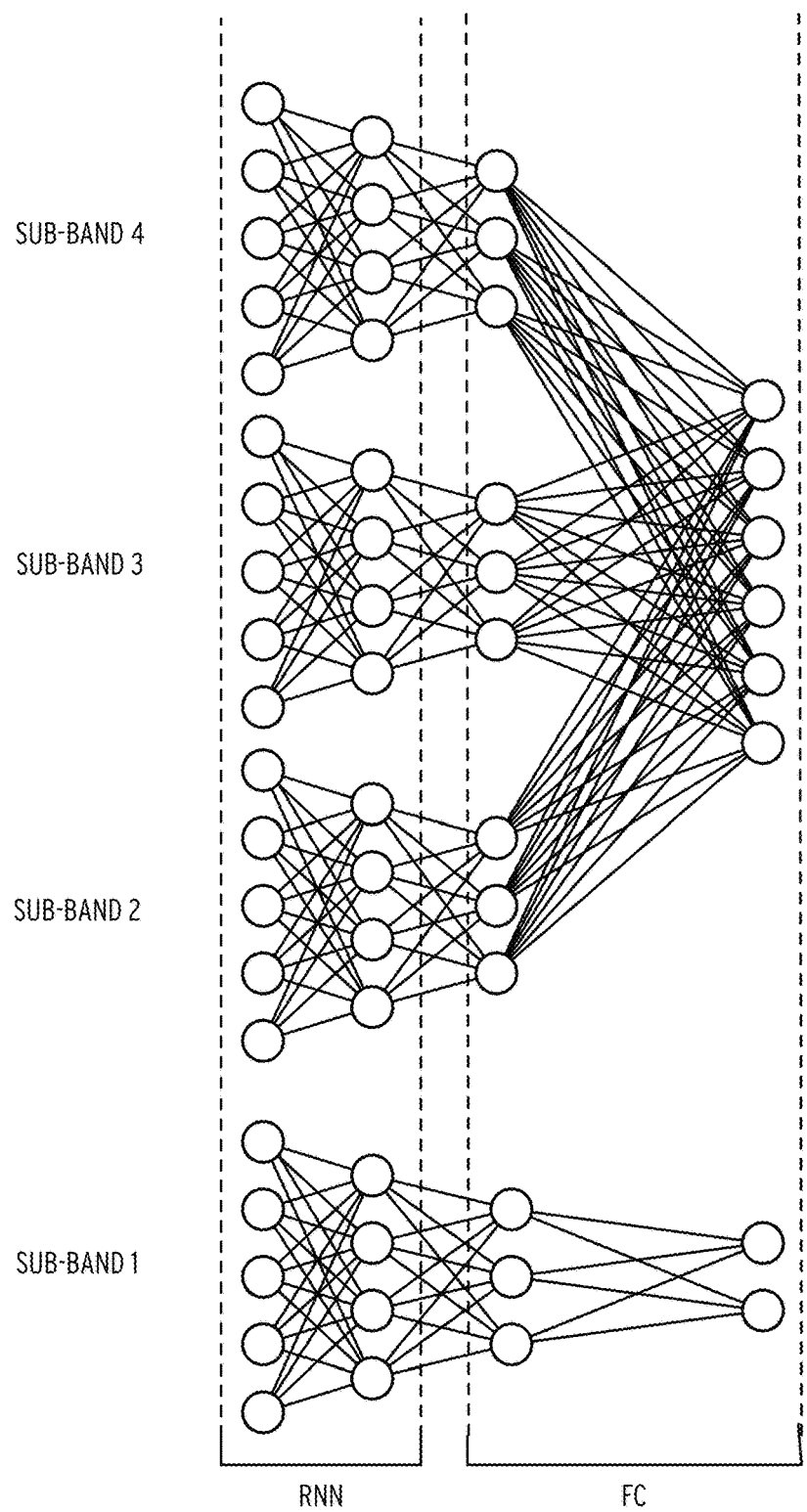
Figure 3C:
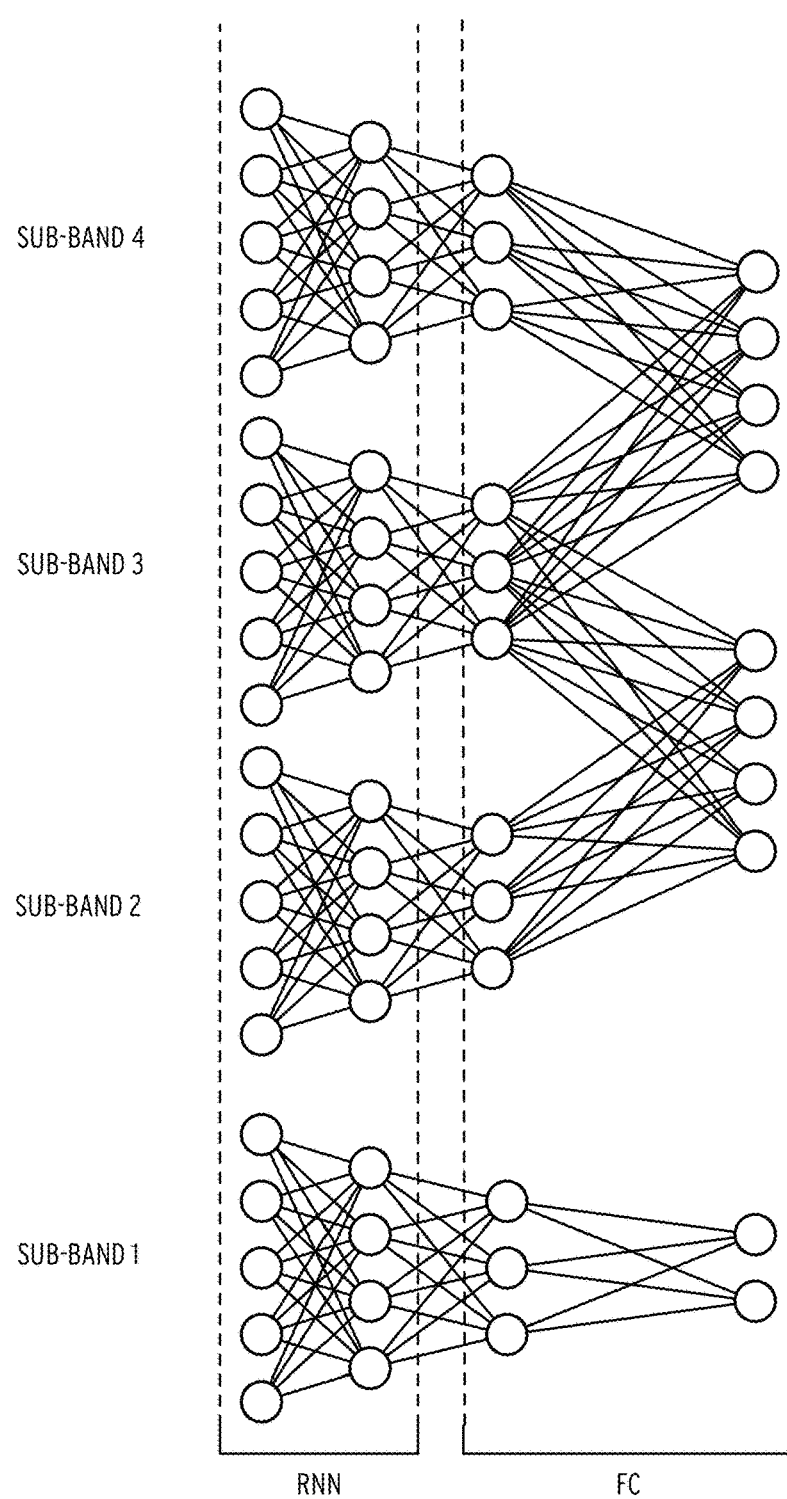

These scenarios are illustrated in FIGS. 3B and 3C.

As a preliminary matter, FIG. 3A illustrates the nodes of a DNN described in FIGS. 1A and 2A. Here, the hidden layer RNN phase contains two layers with five and four nodes respectively. The FC phase includes two layers having three and two nodes, respectively. Each sub-band vector is input into each corresponding layer, generating the output vector.

FIG. 3B illustrates a first DNN configured discussed in connection with FIG. 2B.

In FIG. 3B, the method would process the sub-band vector for sub-band 1 as described in FIG. 2A. In contrast, sub-bands 2, 3 and 4 have been determined to share network characteristics and are combined. Each sub-band (2, 3, and 4) are input corresponding DNNs. The first three layers of processing are performed as described in FIG. 2A. However, the outputs of the first FC layer of each DNN are used as a single input into a final FC layer, the FC layer comprising six nodes.

FIG. 3C illustrates a second DNN configured discussed in connection with FIG. 2B.

Here, the first three layers of the DNNs are handled as described in FIG. 3B. However, unlike FIG. 3B, the DNN in FIG. 3C does not combine all outputs of the first FC layers of sub-bands 2-4 as an input into a final FC layer. Rather, the DNN in FIG. 3C maintains two separate final FC layers. The outputs of sub-bands 3 and 4 are used as inputs to the first FC layer and the outputs of sub-bands 3 and 2 are used as the inputs to the second FC layer. In some embodiments, one may use this configuration when a given sub-band bleeds or is related to more than one sub-band.

Returning to FIG. 2B, in step 226 the method determines if any fully connected layers need to be processed and, if so, continues to process the remaining layers in step 224.

Alternatively, the fully connected output vectors have been computed, the method concatenates the grouped DNN outputs and independent DNN outputs into a concatenated output matrix. In one embodiment, this step may be performed similarly to that described in step 212, the description of which is incorporated by reference.

Figure 4:
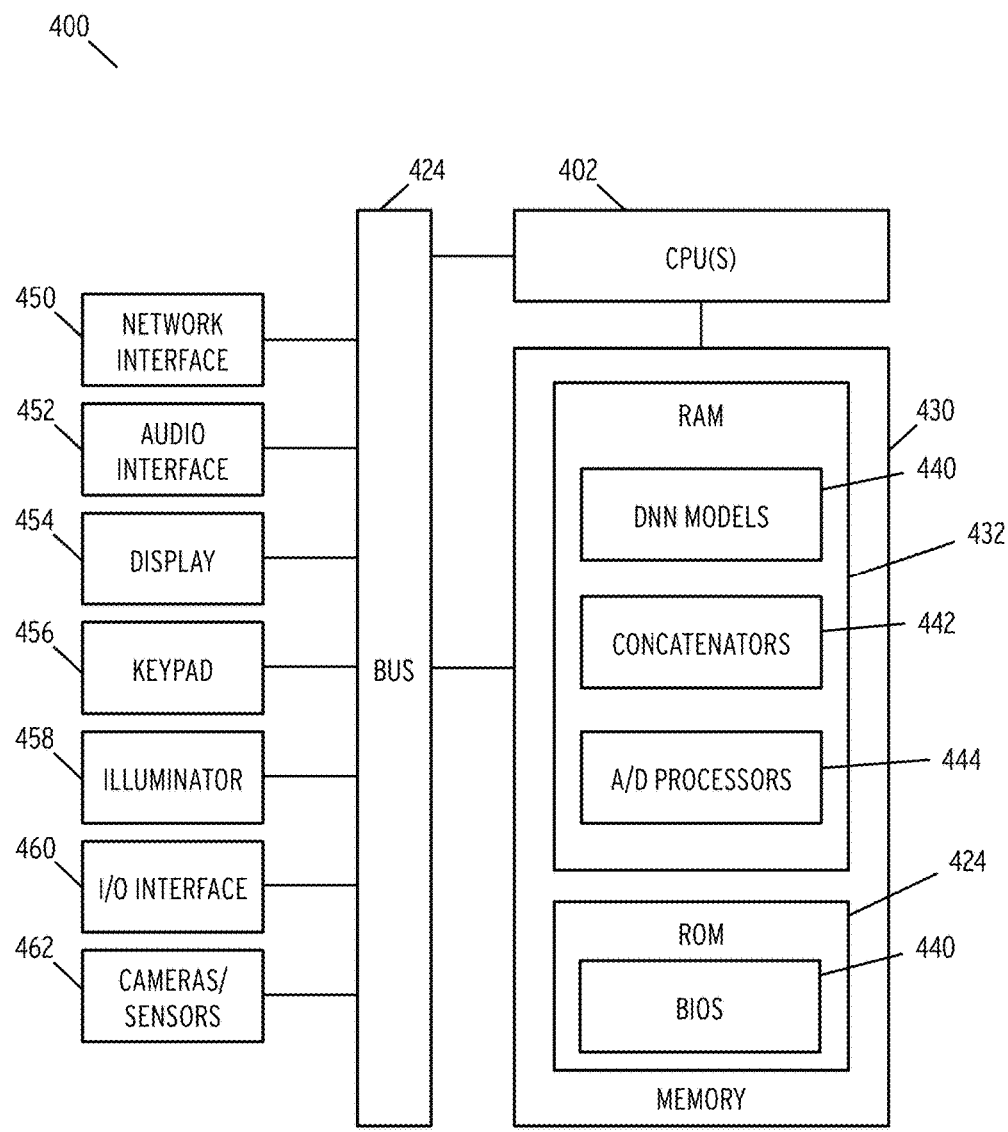
FIG. 4 is a hardware diagram illustrating a device for enhancing the quality of an audio signal according to some embodiments of the disclosure.

FIG. 4 is a hardware diagram illustrating a device for enhancing the quality of an audio signal according to some embodiments of the disclosure.

Client device 400 may include many more or fewer components than those shown in FIG. 4. However, the components shown are sufficient to disclose an illustrative embodiment for implementing the present disclosure. Client device 400 may represent, for example, client devices discussed above in relation to FIGS. 1A, 1B, and 1C.

As shown in FIG. 4, client device 400 includes a processing unit (CPU) 422 in communication with a mass memory 430 via a bus 424. Client device 400 also includes one or more network interfaces 450, an audio interface 452, a display 454, a keypad 456, an illuminator 458, an input/ output interface 460, and a camera(s) or other optical, thermal or electromagnetic sensors 462. Client device 400 can include one camera/sensor 462, or a plurality of cameras/sensors 462, as understood by those of skill in the art.

Client device 400 may optionally communicate with a base station (not shown), or directly with another computing device. Network interface 450 includes circuitry for coupling client device 400 to one or more networks and is constructed for use with one or more communication protocols and technologies. Network interface 450 is sometimes known as a transceiver, transceiving device, or network interface card (NIC).

Audio interface 452 is arranged to produce and receive audio signals such as the sound of a human voice. For example, audio interface 452 may be coupled to a speaker and microphone (not shown) to enable telecommunication with others and generate an audio acknowledgement for some action. Display 454 may be a liquid crystal display (LCD), gas plasma, light emitting diode (LED), or any other type of display used with a computing device. Display 454 may also include a touch sensitive screen arranged to receive input from an object such as a stylus or a digit from a human hand.

Keypad 456 may comprise any input device arranged to receive input from a user. For example, keypad 456 may include a push button numeric dial, or a keyboard. Keypad 456 may also include command buttons that are associated with selecting and sending images. Illuminator 458 may provide a status indication and provide light. Illuminator 458 may remain active for specific periods of time or in response to events. For example, when illuminator 458 is active, it may backlight the buttons on keypad 456 and stay on while the client device is powered. Also, illuminator 458 may backlight these buttons in various patterns when particular actions are performed, such as dialing another client device. Illuminator 458 may also cause light sources positioned within a transparent or translucent case of the client device to illuminate in response to actions.

Client device 400 also comprises input/output interface 460 for communicating with external devices, such as UPS or switchboard devices, or other input or devices not shown in FIG. 4. Input/output interface 460 can utilize one or more communication technologies, such as USB, infrared, Bluetooth™, or the like.

Mass memory 430 includes a RAM 432, a ROM 434, and other storage means. Mass memory 430 illustrates another example of computer storage media for storage of information such as computer-readable instructions, data structures, program modules or other data. Mass memory 430 stores a basic input/output system ("BIOS") 440 for controlling low-level operation of client device 400. The mass memory may also stores an operating system for controlling the operation of client device 400. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and operating system operations via Java application programs.

Memory 430 further includes DNN models 440, concatenators 442, and analog-to-digital processors 444. In one embodiment, DNN models 440 store the trained DNN (or other machine learning) models described previously. In some embodiments, DNN models 440 may be retrieved from a remote network or may be trained within the device 400. Concatenators 442 comprises on or more full or partial concatenators as described previously. A/D processors 444 comprise routines for converting incoming analog audio signals into digital representations. In some embodiments, A/D processors 444 may additionally convert a time-domain signal into a frequency domain signal as discussed above. A/D processors 444 may additionally perform segmentation or partitioning of a feature matrix as described above and transmit the sub-band vectors to DNN models 440.

For the purposes of this disclosure a module is a software, hardware, or firmware (or combinations thereof) system, process or functionality, or component thereof, that performs or facilitates the processes, features, and functions described herein (with or without human interaction or augmentation). A module can include sub-modules. Software components of a module may be stored on a computer-readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the preceding exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving an audio signal;
   partitioning a frequency domain representation of the audio signal into a plurality of sub-band vectors;
   inputting each sub-band vector into a corresponding deep neural network;
   calculating, using the corresponding deep neural networks, a plurality of output vectors for each sub-band vector;
   generating at least one fully connected layer using a first subset of the output vectors;
   concatenating a second subset of the output vectors with the fully connected layer to generate a clean audio feature matrix; and
   converting the clean audio feature matrix into a time-domain audio signal.

2. The method of claim 1, the generating at least one fully connected layer comprising generating at least two fully connected layers, the two fully connected layers comprising a first fully connected layer and a second fully connected layer.

3. The method of claim 2, at least one output vector being used to generate both the first fully connected layer and second fully connected layer.

4. The method of claim 1, the inputting each sub-band vector into the corresponding deep neural network comprising processing each sub-band vector using a first stage of the corresponding deep neural networks.

5. The method of claim 4, the first stage of the corresponding deep neural networks comprising one or more hidden layers of the corresponding deep neural networks.

6. The method of claim 5, the first stage of the corresponding deep neural networks additionally comprising one or more fully connected layers of the corresponding deep neural networks.

7. The method of claim 1, the generating the least one fully connected layer comprising generating the fully connected layer using a first layer of a two-layer fully connected stage of the deep neural networks.

8. A non-transitory computer readable storage medium for tangibly storing computer program instructions capable of being executed by a computer processor, the computer program instructions defining the steps of:
   receiving an audio signal;
   partitioning a frequency domain representation of the audio signal into a plurality of sub-band vectors;
   inputting each sub-band vector into a corresponding deep neural network;
   calculating, using the corresponding deep neural networks, a plurality of output vectors for each sub-band vector;
   generating at least one fully connected layer using a first subset of the output vectors;
   concatenating a second subset of the output vectors with the fully connected layer to generate a clean audio feature matrix; and
   converting the clean audio feature matrix into a time-domain audio signal.

9. The non-transitory computer readable storage medium of claim 8, the generating at least one fully connected layer comprising generating at least two fully connected layers, the two fully connected layers comprising a first fully connected layer and a second fully connected layer.

10. The non-transitory computer readable storage medium of claim 9, at least one output vector being used to generate both the first fully connected layer and second fully connected layer.

11. The non-transitory computer readable storage medium of claim 8, the inputting each sub-band vector into the corresponding deep neural network comprising processing each sub-band vector using a first stage of the corresponding deep neural networks.

12. The non-transitory computer readable storage medium of claim 11, the first stage of the corresponding deep neural networks comprising one or more hidden layers of the corresponding deep neural networks.

13. The non-transitory computer readable storage medium of claim 12, the first stage of the corresponding deep neural networks additionally comprising one or more fully connected layers of the corresponding deep neural networks.

14. The non-transitory computer readable storage medium of claim 8, the generating the least one fully connected layer comprising generating the fully connected layer using a first layer of a two-layer fully connected stage of the deep neural networks.

15. An apparatus comprising:
a processor; and
a storage medium for tangibly storing thereon program logic for execution by the processor, the stored program logic comprising:
   logic, executed by the processor, for receiving an audio signal,
   logic, executed by the processor, for partitioning a frequency domain representation of the audio signal into a plurality of sub-bands vectors,
   logic, executed by the processor, for inputting each sub-band vector into a corresponding deep neural network,
   logic, executed by the processor, for calculating, using the corresponding deep neural networks, a plurality of output vectors for each sub-band vector,
   logic, executed by the processor, for generating at least one fully connected layer using a first subset of the output vectors,
   logic, executed by the processor, for concatenating a second subset of the output vectors with the fully connected layer to generate a clean audio feature matrix, and
   logic, executed by the processor, for converting the clean audio feature matrix into a time-domain audio signal.

16. The apparatus of claim 15, the logic for generating at least one fully connected layer comprising logic, executed by the processor, for generating at least two fully connected layers, the two fully connected layers comprising a first fully connected layer and a second fully connected layer.

17. The apparatus of claim 16, at least one output vector used to generate both the first fully connected layer and second fully connected layer.

18. The apparatus of claim 15, the logic for inputting each sub-band vector into the corresponding deep neural network comprising logic, executed by the processor, for processing each sub-band vector using a first stage of the corresponding deep neural networks.

19. The apparatus of claim 18, the first stage of the corresponding deep neural networks comprising one or more hidden layers of the corresponding deep neural networks.

20. The apparatus of claim 19, the first stage of the corresponding deep neural networks additionally comprising one or more fully connected layers of the corresponding deep neural networks.

21. The apparatus of claim 15, the logic for generating the least one fully connected layer comprising logic, executed by the processor, for generating the fully connected layer using a first layer of a two-layer fully connected stage of the deep neural networks.

* * * * *